Aug. 15, 1939. A. L. HANN 2,169,387
BEVERAGE COOLER
Filed March 2, 1937
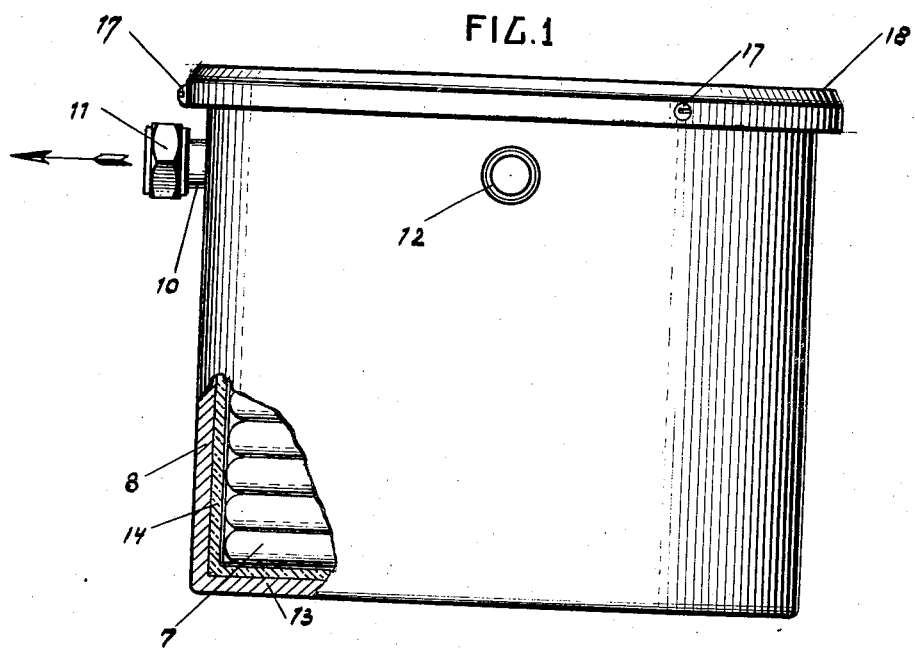
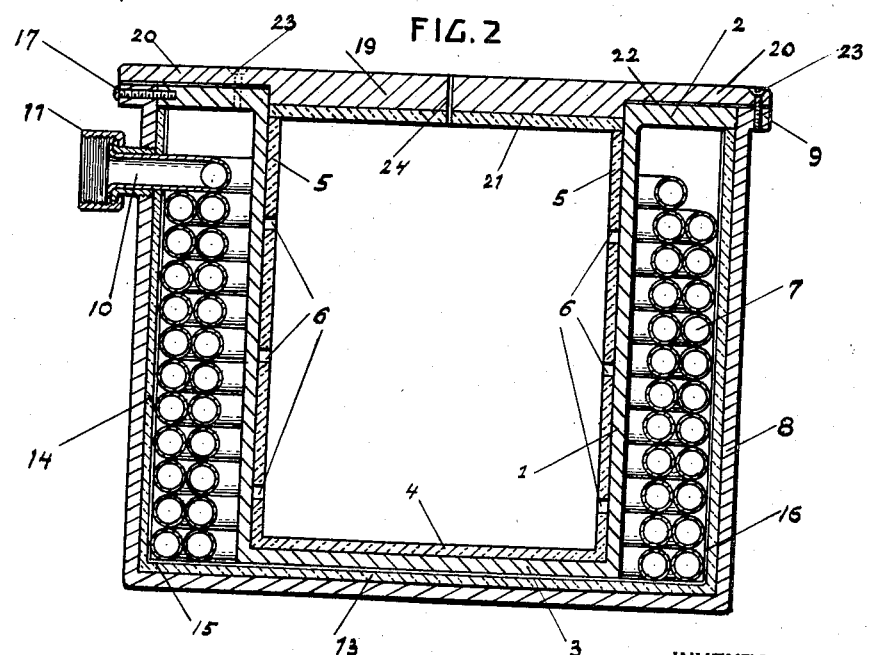
INVENTOR
Alan Laurence Hann Patented Aug. 15, 1939

2,169,387

UNITED STATES PATENT OFFICE 2,169,387

BEVERAGE COOLER

Alan Lawrence Hann, Newark, N. J.

Application March 2, 1937, Serial No. 128,592

5 Claims. (Cl. 62—147)

This invention relates to beer coolers specifically, and generally to coolers of liquids, utilizing as a refrigerant dry-ice or solidified carbon dioxide.

The object of this invention is to cool beverage to the proper temperature prior to dispensing them for consumption.

Another object of this invention is to provide a beverage cooler that is simple in structure, and therefore inexpensive to construct and inexpensive to maintain.

Another object of this invention is to provide a beverage cooler that is extremely small, compact and light.

Another object of this invention is to provide a beverage cooler that utilizes a cheap refrigerant.

Another object of this invention is to provide a beverage cooler that cools a limited quantity of the beverage at one time, thereby effecting economies in its operation.

Another object of this invention is to provide a beverage cooler that may quickly and simply be installed in a beverage conduit line, for example, beneath a bar, in a very small space where it will not interfere with other objects in its vicinity.

Another object of this invention is to provide a beverage cooler that needs no drains and operates without the necessity for removal of a refrigerant residue.

Another object of this invention is to provide a beverage cooler that is easily kept clean and sanitary.

Other objects and advantages will become apparent from the following description and the accompanying drawing in which—

Figure 1 is a side view.

Figure 2 is a vertical section.

The device consists, generally speaking, of a refrigerant-container in heat exchange relation with coils through which a beverage is to be passed and the whole is enclosed in an insulated chamber.

Referring now to the figures, the device consists of an inner chamber 1 cylindrical in form of heat conducting material. This chamber is adapted to receive a quantity of dry-ice. This chamber is flanged 2, its form being that of an inverted top-hat. The chamber 1 is lined at the bottom 3 with a heavy layer of heat-insulating material 4, such as cork. The side walls of the chamber 1 are also lined with a layer of insulating material 5. At intervals, the side wall insulation 5 is pierced by holes 6—6, etc., to facilitate the heat exchange between the inner chamber and other parts of the device.

Surrounding the inner chamber 1 is a double worm coil 7 of suitable composition and adapted to the passage of beer, ale, or some such other beverage to be cooled before being dispensed and consumed.

This entire worm and inner chamber 1 is enclosed in an outer or insulatory chamber or shell 8 also cylindrical and flanged 9 as is the inner chamber 1. The flange 2 of the inner chamber 1 is of such size as to rest exactly within the outer chamber 8 with the flange 2 acting as a cap or closure for the outer chamber 8. The worm 7 passes through the insulatory chamber 8 to a nipple 10; a union 11 adapts and connects it to the beverage tap-line. The other end of the worm passes through the insulatory chamber by a nipple 12.

The inside of the insulatory chamber 8 is lined with a heavy layer of insulating material such as cork both at the bottom 13 and at the sides 14. To protect this insulatory material on the bottom and side walls from moisture that may collect from the worm coils 7, a thin protective sheet of metal 15 is placed over the bottom layer 13 and a similar sheet 16 over the side walls layers 14.

To fasten the chambers together and make them a single unit, screws 17—17 through the flanges 2, 9 are used.

To close the inner chamber 1, a cover 18 is used. The center part of the cover 19 is of greater thickness than the outer part 20—20. The center part 19 is designed to snugly fit into and act as a closure for the inner chamber 1. The center part 19 is covered with a heavy layer of insulatory material 21. The outer part 20—20 of the cover is designed to fit over the flanges 2, 9. A washer 22, of rubber preferably, is used between the outer part of the cover 20—20 and the flanges 2, 9. The cover 18 is fastened to the outer chamber 8 by screws 23—23. There is a vent-hole 24 in the cover to allow for the escape of the $CO_2$.

The operation of the cooler is as follows:

A quantity of dry ice is placed in the chamber 1. Beer, or some such beverage, is then introduced into the worm coil 7 through the nipple 12. The beer flows out through the nipple 10 which may be connected to a tap by a length of pipe. Heat exchange takes place between the beverage in the worm coil 7 and the dry ice in the chamber 1. The thickness of the insulatory material 5 and the number of holes 6—6 therein may be varied to control or limit the cooling effect of the dry ice.

The inventor intends his specifications and drawings to be interpreted as illustrative and not as limiting the form of his invention as many changes can be made in the illustrated and described structure without departing from the spirit of the invention therein embodied.

What is claimed is:

1. In a beverage cooling device, an inner solid-walled chamber of heat conducting material adapted to receive a solid refrigerant, heat insulating material disposed about the inner chamber's walls, perforations at intervals in the heat insulating material to facilitate the heat exchange, a solid refrigerant disposed in the inner chamber, a beverage conduit arranged in heat exchange relation outside the inner chamber, an outer shell enclosing the inner chamber, heat insulating material entirely lining the outer shell, a protective layer of moisture-proof material over the insulating material, a heat insulating cover for the inner chamber, a seepage vent hole in the cover.

2. In a beverage cooling device, an inner solid-walled chamber of heat conducting material adapted to receive a solid refrigerant, heat insulating material disposed about the inner chamber's walls, perforations at intervals in the heat insulating material to facilitate the heat exchange, a solid refrigerant disposed in the inner chamber, a double worm coil beverage conduit arranged in heat exchange relation outside the inner chamber, an outer shell enclosing the inner chamber, heat insulating material entirely lining the outer shell, a protective layer of moisture-proof material over the insulating material, a heat insulating cover for the inner chamber, a seepage vent hole in the cover.

3. In a beverage cooling device, an inner solid-walled chamber of heat conducting material adapted to receive a solid refrigerant, a flange or lip-like protuberant collar on the inner chamber, heat insulating material disposed about the inner chamber's walls, perforations at intervals in the heat insulating material to facilitate the heat exchange, a solid refrigerant disposed in the inner chamber, a double worm coil beverage conduit arranged in heat exchange relation outside the flanged inner chamber, an outer shell enclosing the inner chamber by meeting with the protuberant flanges, heat insulating material entirely lining the outer shell, a protective layer of moisture-proof material over the insulating material, a heat insulating cover for the inner chamber, a seepage vent hole in the cover.

4. In a beverage cooling device, an inner chamber of heat conducting material adapted to receive a solid refrigerant, heat insulating material perforated at intervals to retard heat exchange lining the inner chamber, dry ice disposed in the inner chamber, a beverage conduit arranged in heat exchange relation around the inner chamber, a heat insulating shell enclosing the inner chamber and beverage conduit, a heat insulatory cover for the inner chamber, a vent hole in the heat insulating cover.

5. In a beverage cooling device, an inner chamber of heat conducting material adapted to receive a solid refrigerant, heat insulating material perforated at intervals to control the heat exchange lining the inner chamber, dry ice disposed in the inner chamber, a beverage conduit arranged in heat exchange relation to the inner chamber, an outer shell enclosing the inner chamber, heat insulating material lining the outer shell, a protective layer of moisture-proof material over the insulating material, a heat insulating cover for the inner chamber, a vent hole in the heat insulating cover.

ALAN LAWRENCE HANN.